United States Patent [19]

Urstöger

[11] Patent Number: 4,616,170

[45] Date of Patent: Oct. 7, 1986

[54] ARRANGEMENT AND METHOD FOR OPERATING AN ELECTROCHEMICAL STORAGE DEVICE

[75] Inventor: Rupert Urstöger, Uttenreuth, Fed. Rep. of Germany

[73] Assignee: Siemens Aktiengesellschaft, Munich, Fed. Rep. of Germany

[21] Appl. No.: 634,649

[22] Filed: Jul. 25, 1984

[30] Foreign Application Priority Data

Jul. 25, 1983 [DE] Fed. Rep. of Germany ....... 3326729

[51] Int. Cl.$^4$ .............................................. H02J 7/00
[52] U.S. Cl. ......................................... 320/5; 320/14; 320/18
[58] Field of Search ................ 320/5, 6, 13, 14, 15–18

[56] References Cited

U.S. PATENT DOCUMENTS

| | | | |
|---|---|---|---|
| 3,454,859 | 7/1969 | Ford et al. | 320/13 X |
| 3,928,791 | 12/1975 | Mullersman | 320/18 X |
| 3,930,192 | 12/1975 | Dinkler | 320/17 X |
| 3,997,830 | 12/1976 | Newell et al. | 320/14 X |

*Primary Examiner*—R. J. Hickey
*Attorney, Agent, or Firm*—Kenyon and Kenyon

[57] ABSTRACT

In an electrochemical storage device such as a zinc-bromine or zinc-chlorine accumulator containing groups of electrochemical cells connected in series to a load, nonuniformly distributed deposits of the active electrochemical material on the electrodes are removed by a complete discharge of the cells. While the storage device energizes a principal load, the cell groups of the storage device are discharged in a cyclic sequence via an auxiliary load and disconnected from the series circuit of the cell groups no later than the time at which the respective cell group has attained its operational use limit. The disconnected discharging cell group is further discharged via the auxiliary load until the nonuniformly distributed deposits on the electrodes of the cell group are totally removed. The cell group is then recharged and reinserted into the series circuit of the cell groups or, alternatively, reconnected to the series circuit and then recharged. The method of operation enables the energization of a load by the storage device while the device is being regenerated.

6 Claims, 2 Drawing Figures

ARRANGEMENT AND METHOD FOR OPERATING AN ELECTROCHEMICAL STORAGE DEVICE

BACKGROUND OF THE INVENTION

This invention relates to an arrangement for operating an electrochemical storage device, particularly a zinc-bromine or zinc chlorine accumulator, in which the electrochemically active material goes into solution during a discharging process and is deposited again on an electrode during a charging process, and in which groups of cells of the accumulator are connected in series to a load. More particularly, this invention relates to such a storage device which is operatively connected to a first auxiliary device for breaking up non-uniformly distributed deposits at the electrodes of the accumulator by completely discharging cells thereof via a resistor and to a second auxiliary device for recharging the cells of the storage device.

The utilization of a zinc-chlorine storage battery in an electric car has been described in Newsweek, June 26, 1980, page 75.

U.S. Pat. No. 4,287,267 discloses a method for by-passing electric current around a defective group of cells of a zinc-chlorine storage system comprising a multiplicity of parallel-connected storage devices. The defective cell group is shorted out of operation by means of a switch and is discharged no further. A power supply for an electrolyte pumping motor, a gas pumping motor and the chlorine gas feed valve are switched off simultaneously with the shorting of the defective cell group. In this manner the operating reliability and availability of a zinc-chlorine storage device can be increased.

Electrochemical storage devices such as zinc-chlorine accumulators are distinguished by high energy density and high power density. In practice, however, the number of charging cycles of such devices are limited. One reason for this limitation is leakage or parasitic currents due to the bipolar arrangement of the electrodes and to the fact that the electrolyte feed takes place via a common main line. The leakage or parasitic currents lead to energy losses and nonuniform zinc deposition (dendrite formation), which effect increases with an increasing number of individual cells combined in a group and is greatest at the electrolyte feeds in the vicinity of the negative end pole of the bipolar cell block. With an increasing number of charge-discharge cycles, normal electrolyte circulation is disturbed and zinc deposition in the individual cells becomes nonuniform, so that finally, the deviations render the storage device inoperative. Furthermore, the formation of dendritic crystals can damage the plates and separators, thereby making the battery useless.

A known method for eliminating parasitic currents consists of opposing to the battery voltage at the electrolyte lines a counter-voltage of about the same magnitude, which counter-voltage compensates the flow of the parasitic currents. The nonuniformity of the crystalline depositions on the electrodes is reduced but not eliminated by this method. Although the total attainable number of charging and discharging cycles prior to inoperability and danger of damage is increased owing to the state of asymmetry in the deposits, this number is still too small for practical application.

A further reason for the generation of nonuniform deposits on the electrodes is seen in the basic mechanisms of the electro-chemical processes, according to which greater deposition continues to occur at already existing crystal deposits owing to increased electric field strength. This necessitates a special treatment of the storage device which consists substantially of a time-consuming complete discharge of the storage device, whereby the deposits are broken up. In the subsequent charging, a uniform new layer is produced again.

During a complete discharge of an electrochemical storage device, the device is not available for energizing a load. In the case of batteries for vehicle propulsion, it is therefore necessary to stock similar storage devices or otherwise a down-time for the entire vehicle occurs.

U.S. Pat. Nos. 3,997,830 and 3,454,859 disclose arrangements for totally discharging a nickel-cadmium accumulator and regenerating and restoring a uniform voltage condition to all cells or groups of cells and for minimizing the degree the efficiency is lowered.

In a design described in U.S. Pat. No. 3,997,830, a solar array and two electrochemical storage devices are connected in parallel to a spacecraft load, the individual cells of the storage devices each being couplable to a discharging resistor. While one storage device is being overhauled and the individual cells thereof are connected to respective discharging resistors by means of a remote control operated from a ground station, the other storage device and the solar battery are available for supplying power to the load. During the discharge operation, the voltage across the terminals of the discharging storage device is monitored and, upon the attainment thereby of a minimum voltage or upon the elapse of a predetermined discharge time, the discharged storage device is charged up again, the charging being monitored by a charge control device.

U.S. Pat. No. 3,454,859 sets forth an arrangement for completely discharging the cells of a nickel-cadmium battery. To increase the life and availability of the battery, the voltage of the entire storage device and of each individual cell is monitored. If the voltage of the entire storage device or of one cell sinks below a predetermined value, the entire storage device is separated from a solar powered charging device and is subsequently discharged via transistor shunted across the storage device. The discharge operation is determined in part by the cell having the lowest voltage. If the voltage of this cell reaches zero, for instance, the discharge of this cell is blocked and the further discharge of the remaining cells is carried out by additional transistors connected in parallel to each cell. Upon the discharge of all the cells, the storage device is reconnected to the solar cell battery for charging.

In the known designs, the load must be connected, during the discharging of the storage device, to another energy source formed by a second storage device or a solar cell system. Such arrangements are of no utility where a second storage device cannot be accommodated for lack of space or for weight reasons.

An object of the present invention is to provide an improved electrochemical power assembly of the above-described type which has an increased availability.

Another object of the present invention is to provide such an electrochemical power assembly for supplying a load in systems in which a second electrochemical storage device cannot be accommodated for weight reasons or for lack of space.

Another object of the present invention is to provide an improved method of operating an electrochemical storage device of the above-described type such that the availability of the device is increased.

A further object of the present invention is to provide a method of operating such an electrochemical storage device for use in systems in which a second back-up storage device cannot be provided for reasons such as weight or space limitations.

SUMMARY OF THE INVENTION

This invention providea an improved method for operating an electrochemical storage device in which electrochemically active material enters into solution during a discharging process and is redeposited on electrodes of the storage device during a charging process. The storage device has a multiplicity of groups of electrochemical cells connected in series to a load. Discharging means are operatively couplable to the storage device for breaking up nonuniformly distributed deposits at the electrodes of the storage device by completely discharging the cells of the storage device via a resistor. Energizing means such as a power supply is operatively connectable to the storage device for recharging the cells thereof.

In accordance with a feature of the present invention, the cell groups of the storage device are disconnected individually in a cyclic sequence from a series-connected circuit including a load. The disconnected cell group is discharged via a resistor so that deposits on the electrodes of the disconnected cell group are removed. The discharging of the disconnected cell group may be initiated prior to the disconnection of the cell group from the series-connected circuit or, alternatively, may be initiated only after the cell group has removed from the series circuit. Upon the completion of the discharging process, the cell group is recharged. The recharging process may be commenced either before or after reconnection of the discharged cell group back into the series circuit.

If the discharging process is commenced prior to the disconnection of the particular cell group from the series circuit, the operating condition of this cell group is monitored and, upon the detection of a predetermined state of discharge of the cell group, it is disconnected from the series circuit. Upon disconnection of the cell group, it is subjected to a further discharging operation.

If it is desirable that the storage device maintain approximately a constant voltage across its output terminals, the cell groups are advantageously disconnected from the series circuit prior to the beginning of the discharging operation. In this way a constant number of cell groups may be maintained in the series circuit with a load. A discharged and subsequently recharged cell group is then reconnected into the series circuit substantially simultaneously with the disconnection therefrom of another cell group.

An electrochemical power system in accordance with the present invention comprises a rechargeable electrochemical storage device operatively connectable across a principal load and having a multlplicity of cell groups conductively linked in a series-connected circuit to each other. A discharging device including a auxiliary load is operatively couplable to the storage device for breaking up nonuniformly distributed deposits at the electrodes of the storage device by completely discharging the cells thereof via the auxiliary load. Switches are operatively connected to the cell groups of the storage device for disconnecting individual ones of the cell groups from the series connected and connecting the other cell groups of the storage device to each other to maintain the series circuit. A control or programmer unit is operatively coupled to the switches and to the discharging device for causing the switches to automatically disconnect the cell groups individually from the series circuit in a predetermined cyclic sequence and for coupling the discharging device to each of the cell groups separately in the same predetermined cyclic sequence. A power supply is provided for recharging a cell group upon the discharge thereof. The control or programmer unit is operatively connected to the power supply for coupling the same to a cell group upon discharge thereof.

The method and apparatus in accordance with the present invention enables a nonuniform deposition of the active electrochemical material on the electrodes of the storage device to be repeatedly broken up without interruption of the operation of the storage device. Thus, in contrast to known methods and apparatus, the normal operation of the electrical load need not be interrupted during removal of the nonuniformly distributed deposits even if only one storage device and only one resistor for the discharging operation are used. Moreover, maintenance work for an electrochemical storage device designed or operated in accordance with the present invention can be reduced considerably. In addition, in the case that the cell groups or battery modules are regenerated at short time intervals, the electrodes of the cells can be spaced at small distances from one another because the attainable dendrite heights will be smaller. In this case, the resistance of the storage device will be smaller and the losses will be reduced so that less cooling is required and efficiency is improved.

The resistor or load across which the cell group to be discharged is connected is advantageously realized by the resistance of an operating component requiring electrical power to perform its intended function. Thus, if the cell group to be discharged has reached its operational use limit, the remaining energy can also be utilized.

DETAILED DESCRIPTION

Figure 1:
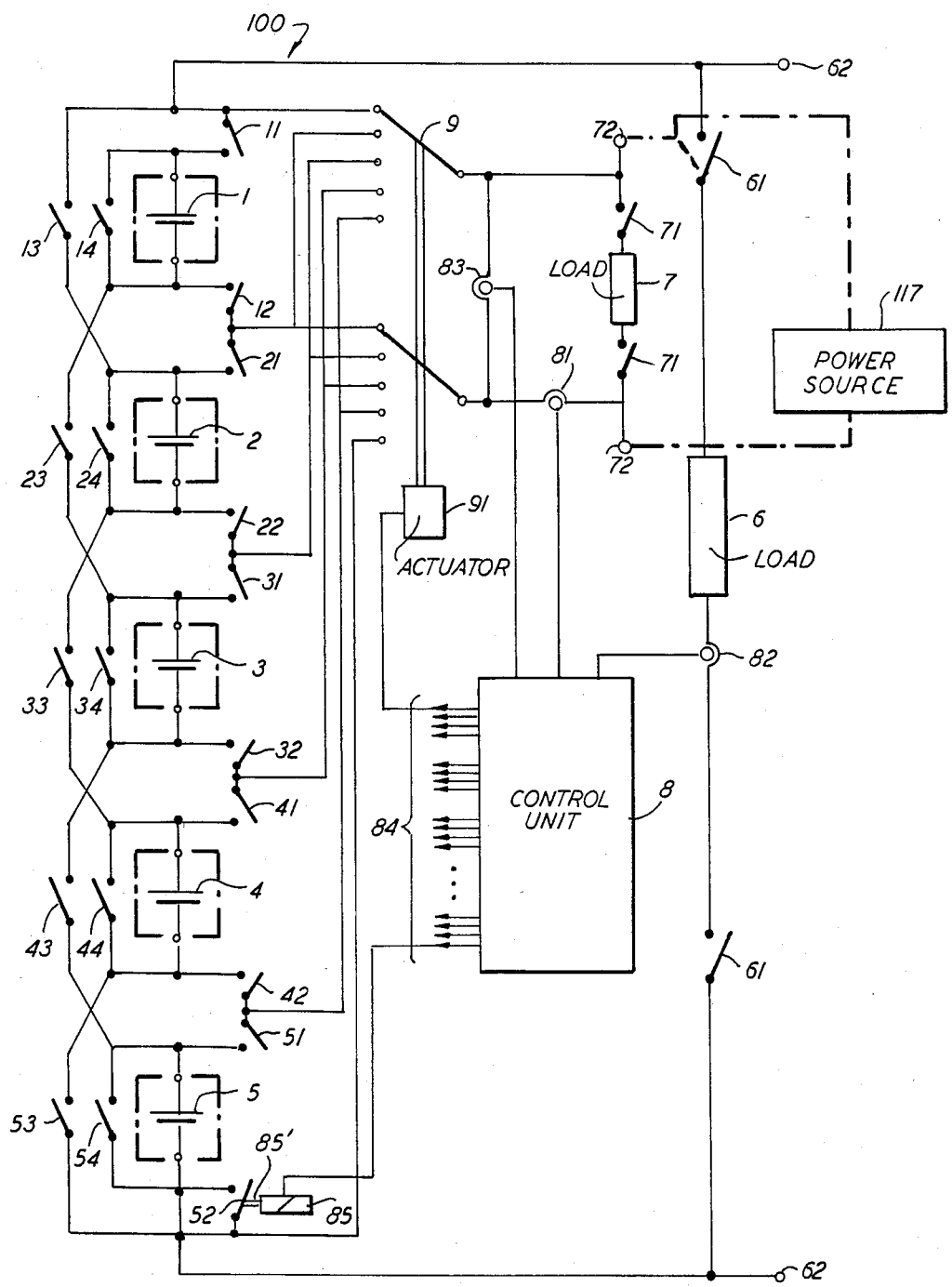
FIG. 1 is partially a schematlc circuit diagram and partially a block diagram of an electrochemical storage device with a discharging device, recharging means and a control unit in accordance with the present invention.

As illustrated in FIG. 1, an electrochemical storage device 100 includes a multiplicity of groups 1-5 of electrochemical cells connected in a series circuit to each other and connectable to a load 6 by means of a switch 61. The storage device may be a zinc-bromine or zinc-chlorine accumulator in which the active electrochemical material enters into solution during a discharging process and is redeposited on the electrodes of the electrochemical cells during a charging process.

Each cell group 1-5 can be operated independently of the others with respect to electrolyte circulation. Each cell group has an electrolyte feed line (not illustrated), an electrolyte discharge line (not illustrated) and a pump (not illustrated).

In accordance with the invention, the electrochemical storage device 100 is operated so that the cell groups are individually discharged in a predetermined cyclic sequence. For implementing this method of operation, switch contacts 11, 12, 21, 22, 31, 32, 41, 42, 51 and 52 are arranged in line connections, whereby a series circuit including cell groups or battery modules 1–5 may be established. One switch contact is inserted in every lead and two switch contacts in every line connection. For example, switch contacts 11 and 52 are provided in respective leads connected to cell groups 1 and 5, respectively, while contacts 12 and 21 are placed in the line connection between groups 1 and 2.

Switch contacts 11, 12, 21, 22, 31, 32, 41, 42, 51 and 52 serve the additional purpose of disconnecting a selected cell group 1–5 from the assembly and re-establishing a series circuit of the remaining cell groups with the load 6. Further switch contacts 13, 23, 33, 43 and 53 perform the function of re-establishing the series circuit if a cell group is disconnected. For example, if switch contacts 32 and 51 are open, whereby cell group 4 is disconnected from the series circuit of storage device 100, switch contact 43 is closed to couple cell group 3 to cell group 5 and thereby complete the series circuit.

Another set of switch contacts 14, 24, 34, 44 and 54 are provided for shorting a disconnected cell group 1–5.

A double-pole switch 9 having an actuator 91 is provided for connecting each cell group 1–5 separately to an additional load or resistor 7. For controlling the operation of double-pole switch 9, as well as switching operations in general, a control or programmer unit 8 is provided which has a multiplicity of output leads 84 extending to actuator 91 and to a multiplicity of electromagnetic actuators 85 (only one shown in the drawing) having plungers or actuator rods 85' coupled to respective switch contacts 11–14, 21–24, 31–34, 41–44 and 51–54 for controlling the operational state of the switch contacts.

Control unit 8 receives input signals from a pair of current sensors 81 and 82 and a voltage sensor 83. Sensors 81 and 82 serve to detect the current in the lead extending to the principal load 6 and in the lead extending to the additional or auxiliary load 7. Sensor 83 serves to determine the voltage of the cell group connected to the auxiliary load 7.

If principal load 6 can tolerate changes in voltage, it is first supplied from all cell groups 1–5 connected in series upon the closure of contacts 61, 11, 12, 21, 22, 31, 32, 41, 42, 51 and 52. As described in detail hereinafter, if load 6 requires a relatively constant voltage, the load is connected across a series circuit of storage device 100 comprising a constant number of cell groups 1–5, at least one group being disconnected from the series circuit at any one time.

Figure 2:
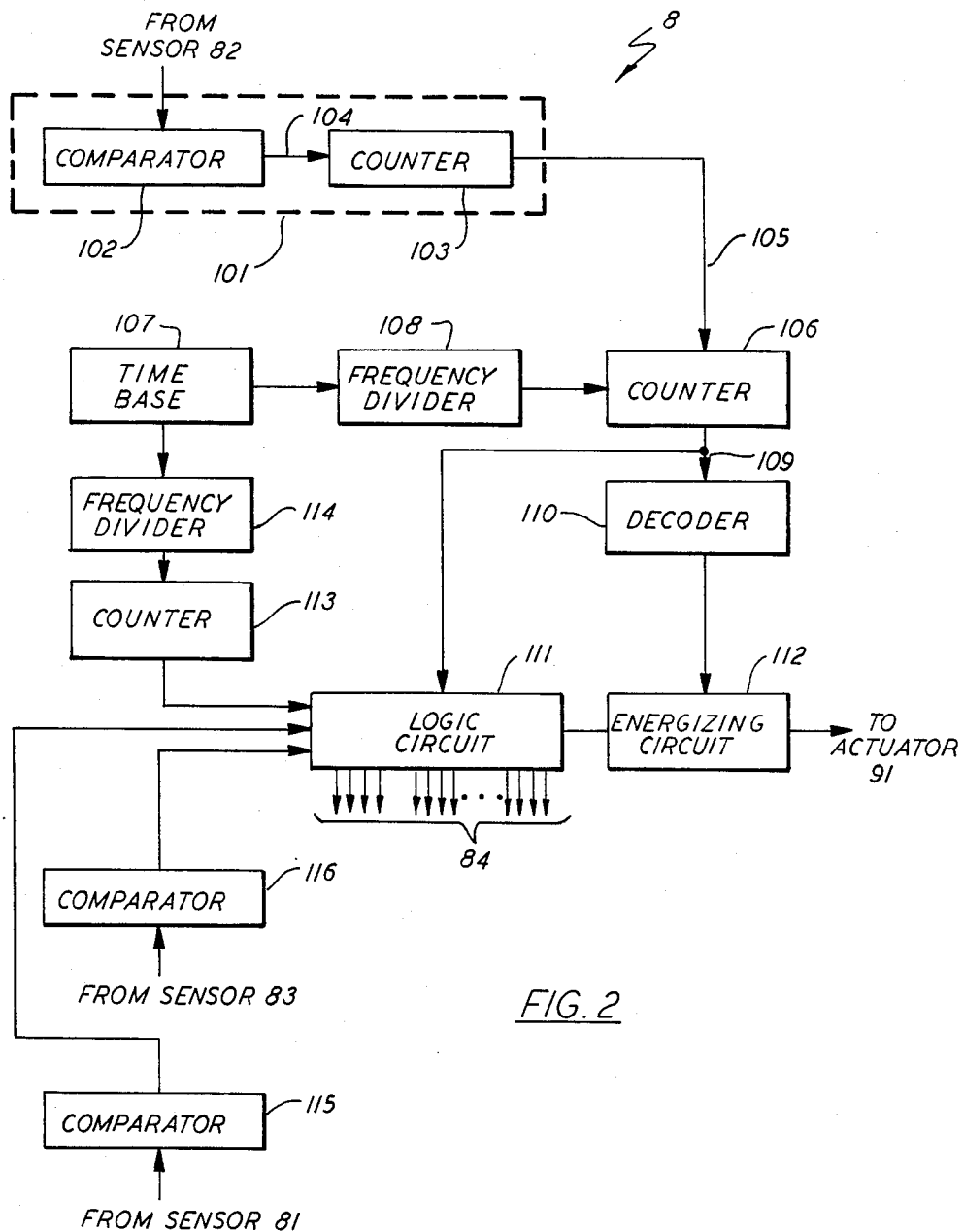
FIG. 2 is a block diagram of the control unit of FIG. 1.

As illustrated in FIG. 2, control unit 8 has a subunit or circuit 101 known per se which initiates a cyclic discharge sequence upon detecting that a predetermined number of operational discharges and/or recharges (e.g., 10 recharges) have occurred. Subunit 101 may comprise a comparator 102 and a counter 103 connected in series to an input extending from current sensor 82. Upon detecting in response to a signal from sensor 82 that the current passing through the principal load 6 has fallen below a given level or has risen above a given threshold, comparator 102 generates a signal on a lead 104 extending to a stepping input of counter 103. Upon the occurrence of a predetermined number of discharges or recharges of storage device 100, equal to the count capacity of counter 103, the counter generates a signal on a lead 105 extending to the resetting input of another counter 106.

Counter 106 has a stepping input connected to a time base or clock signal generator 107 by means of a frequency divider 108. The period between successive stepping pulses transmitted to counter 106 from frequency divider 108 corresponds substantially to the time interval required for the discharge and recharge of a cell group 1–5 of storage device 100. The count level of counter 106 is fed via a multiple 109 to a decoder 110 and to a logic circuit 111, decoder 110 acting to operate actuator 91 via an energizing circuit 112.

Time base 107 steps an additional counter 113 via an additional frequency divider 114, the count level of counter 113 being fed to an input of logic circuit 111. The period between successive stepping pulses fed to counter 113 from frequency divider 114 determines the timing of the charging and recharging operations with respect to each cell group and the timing of the disconnecting and reconnecting operations. Further counters and frequency dividers may be included for providing a greater variation in the range of timing periods.

In accordance with a first embodiment of the present invention, additional load 7 is connected to a cell group 1–5 prior to the disconnection thereof from the series circuit included in the storage device. Because both the principal load 6 and the additional load 7 are connected to a particular cell group, this group is discharged before the other cell groups. The particular cell group remains connected in the series circuit until it has reached the operational use limit for the principal load 6. That this limit has been attained is determined by means of signals fed by sensors 81 and 83 to respective comparators 115 and 116 in control unit 8 (see FIG. 2), these comparators delivering signals to logic circuit 111 upon detecting that the current flowing through the auxiliary load 7 from a cell group has fallen below a predetermined threshold or that the voltage across that cell group has reached a predetermined lower limit.

Upon the attainment of the operational use limit by the cell group which is discharging through the auxiliary load 7, that cell group is disconnected from the series circuit including the other cell groups and the principal load 6. Logic circuit 111 implements the disconnection by energizing appropriate leads. For example, if cell group 1 is connected to the auxiliary load 7, as illustrated in FIG. 1, logic circuit 111 opens contact 21 and closes contact 13. Cell group 1 remains connected to the auxiliary load 7 and is thereby discharged so that nonuniformly distributed deposits on the electrodes of the cell group are removed. Additional loads can be disconnected step by step with decreasing residual charge of the cell group.

Upon the passage of a predetermined time interval, signaled to logic circuit 111 by means of time base 107, counter 113 and frequency divider 114, or, alternatively, upon the attainment of a predetermined discharge state of the cell group connected to auxiliary load 7, which discharge state is signaled to logic circuit 111 by means of nonillustrated additional comparators connected to sensors 81 and 83, logic circuit 111 acts to open switch contacts 71 (a lead 84 extending to a nonillustrated electromagnetic actuator operatively linked to switch contacts 71). At this point, the control unit may short circuit the discharging cell group to implement a total discharge thereof. For example, in the circuit configuration shown in FIG. 1, switch contact 14 may be closed to further the discharge of cell group 1. Upon the elapse of a predetermined period of time, signaled to logic circuit 111 by means of time base 107, counter 113 and frequency divider 114, switch contact 14 is opened and a source of electrical power 117 is connected to terminals 72 for recharging depleted cell group 1.

To ensure the continued supply of auxiliary load 7, this load may be connected, upon disconnection from cell group 1, to other cell groups 2-5 separately in sequence. Upon the recharging of cell group 1, detectable by a logic circuit 111 via comparators 115 and 116, the recharged cell group may be reinserted into the series circuit by the opening of switch contact 13 and the closing of switch contact 21.

As an alternative to recharging a cell group prior to the reconnection thereof in the series circuit, the discharged cell group may be first connected in the series circuit and then recharged together with the other cell groups upon a coupling of power source 117 across terminals 62.

Upon the elapse of a predetermined period of time sufficient for the discharging and recharging of cell group 1 as signaled to logic circuit 111 via time base 107, frequency divider 108 and counter 106, or, alternatively, if the cell groups are recharged prior to reinsertion in the series circuit, upon the reconnection of cell group 1 to the series circuit, control unit 8 acts through actuator 91 and switch 9 to connect cell group 2 across auxiliary load 7. Upon the attainment by cell group 2 of its operational use limit, as detected by sensors 81 and 83, control unit 8 generates signals for opening switch contacts 12 and 31 and closing switch contact 23. Subsequently, i.e., upon the attainment of a predetermined level of discharge by cell group 2, control unit 8 opens switch contacts 21, 22 and 71 encloses switch contact 24. Upon the complete removal of any dendritic formations on the electrodes of cell group 2, switch contacts 21 and 22 are closed and switch contact 24 opened. Power source 117 is then connected to cell group 2 via terminals 72. Upon the complete recharging of cell group 2 as detected by sensors 81 and 83 and communicated to logic circuit 111 via comparators 115 and 116, contacts 12 and 31 are closed and contact 23 opened, whereby cell group 2 is reinserted in the series circuit of the cell groups.

After the discharging and recharging of cell group 2 the remaining groups 3-5 are then connected in a cyclic sequence to auxiliary load 7 until all cell groups have been totally discharged once and deposits removed. A further cycle can follow immediately or can be initiated after the elapse of a predetermined period of time.

If the above-described method is used in an electric vehicle, the auxiliary load can be a compressor, a pump, a fan drive, on board current consumers or the heating system. The principal load is the propulsion drive, which continues to be operated with a slightly reduced voltage after a cell group has been disconnected. This manner of operation has no detrimental effect since the vehicle propulsion is designed to tolerate voltage fluctuations within limits.

For loads which must be supplied with a constant voltage, it is advantageous to design control unit 8 such that a constant number of cell groups are connected in series to the load. In this case, principal load 6 is always energized by a voltage reduced by the voltage of a cell group. Generally a cell group is connected to auxiliary load 7 only upon the disconnection of that cell group from the series circuit of cell groups. Advantageously, a cell group is disconnected from the series circuit substantially simultaneously with the reconnection thereto of a cell group which has just been recharged. Thus, upon the recharging of cell group 3 via power source 17, control unit 8 energizes selective output leads 84 to close leads 22, 41 and 43 and to open leads 32, 33 and 51, whereby cell group 3 is connected into a series circuit comprising cell groups 1, 2, 3 and 5, while cell group 4 is disconnected from that circuit. Actuator 91 is operated by control unit 8 to connect auxiliary load 7 to cell group 4 for implementing the discharge thereof. Upon the reaching of a predetermined threshold by the voltage or current supplied by cell group 4, as detected by sensors 81 and 83, or, alternatively, upon the passage of a predetermined time interval, control unit 8 opens switch contacts 41, 42 and 71 and closes switch contact 44. Upon the complete removal of dentritic formations on the electrodes of cell group 4, control unit 8 acts to recharge the cell group and subsequently to reconnect the cell group in the series circuit simultaneously with the disconnection of cell group 5.

With a method in accordance with the present invention, it is possible to regenerate each cell group once by a complete discharging thereof after a number of charging cycles corresponding to the number of cell groups. If it is not necessary to regenerate a group of cells in each charging cycle of the storage device, it is preferable to regenerate the storage device in the shortest possible time and then to observe an extended pause in the discharging-recharging operations. It is thereby ensured that all cells can be operated with the smallest possible aging difference. In order to assure a continuous energization of the auxiliary loads, these loads can be connected in the time period between two successive regenerating processes in an alternating sequence to another group of cells.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A method for operating an electrochemical storage device in which electrochemically active material enters into solution during a discharging process and is redeposited on electrodes of the storage device during a charging process, said storage device having a multiplicity of groups of electrochemical cells connected in series to a load, discharging means being operatively couplable to said storage device for breaking up nonuniformly distributed deposits at the electrodes of the storage device by completely discharging the cells of the storage device via a resistor, energizing means being operatively connectable to the storage device for recharging the cells thereof, said method comprising the steps of:
   (a) preliminarily discharging via the resistor one of the cell groups of the storage device while maintaining said one of said cell groups in a series-connected circuit including the other cell groups of said storage device and the load;
   (b) monitoring the operating condition of said one of said cell groups;

(c) disconnecting said one of said cell groups from said series-connected circuit upon detecting a predetermined state of discharge of said one of said cell groups, the others of said cell groups and said load being maintained in a series-connected circuit with each other;

(d) upon the disconnecting of said one of said cell groups in step (c), further discharging said one of said cell groups so that deposits on the electrodes of said one of said cell groups are removed;

(e) recharging said one of said cell groups and reconnecting same in a series-connected circuit with the others of said cell groups and said load; and (f) repeating steps (a) through (e) for each of said cell groups in a cyclic sequence.

2. The method of claim 1 wherein the disconnecting of step (c) is executed upon the attainment by said one of said cell groups of its operational use limit.

3. The method defined in claim 1 wherein steps (a) through (e) are performed automatically under the control of a programmer unit.

4. The method of claim 1 wherein the recharging of step (e) occurs prior to the reconnecting of said one of said cell groups to said load and to others of said cell groups.

5. The method of claim 1 wherein the reconnecting of step (e) occurs prior to the recharging of said one of said cell groups.

6. The method of claim 1 wherein said resistor is realized by the resistance of an operating component requiring electrical power to perform its intended function.

* * * * *